United States Patent
Zheng et al.

(10) Patent No.: US 9,349,393 B2
(45) Date of Patent: May 24, 2016

(54) MAGNETIC WRITER HAVING AN ASYMMETRIC GAP AND SHIELDS

(71) Applicant: Western Digital (Fremont), LLC, Fremont, CA (US)

(72) Inventors: Yi Zheng, San Ramon, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/847,634

(22) Filed: Sep. 8, 2015

(65) Prior Publication Data

US 2015/0380018 A1    Dec. 31, 2015

Related U.S. Application Data

(62) Division of application No. 14/289,345, filed on May 28, 2014, now Pat. No. 9,153,255.

(60) Provisional application No. 61/948,417, filed on Mar. 5, 2014.

(51) Int. Cl.
*G11B 5/127* (2006.01)
*G11B 5/23* (2006.01)
*G11B 5/115* (2006.01)
*G11B 5/60* (2006.01)

(52) U.S. Cl.
CPC ........ *G11B 5/23* (2013.01); *G11B 5/115* (2013.01); *G11B 5/6082* (2013.01); *G11B 5/1278* (2013.01)

(58) Field of Classification Search
CPC .................. Y10T 29/49044; Y10T 29/49043
USPC ............... 360/125.3, 119.01, 119.02, 199.03, 360/119.04; 29/603.01, 603.07
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |

(Continued)

OTHER PUBLICATIONS

Notice of Allowance dated Jun. 30, 2015 from U.S. Appl. No. 14/289,345, 9 pages.

(Continued)

*Primary Examiner* — Brian Miller

(57) ABSTRACT

A method and system provide a magnetic transducer. An intermediate layer including multiple sublayers is provided. A trench is formed in the intermediate layer. A main pole having a bottom, a top wider than the bottom, a first side and a second side opposite to the first side is provided in the trench. An asymmetric gap is provided along the first and second sides of the main pole. The asymmetric gap terminates closer to the top of the main pole along the first side than on the second side. The asymmetric gap has a first thickness along the first side and a second thickness different from the first thickness along the second side. An asymmetric shield is provided on the asymmetric gap. The asymmetric shield includes a half side shield having a bottom between the top and the bottom of the main pole and terminating on the asymmetric gap.

6 Claims, 9 Drawing Sheets

(56) References Cited

U.S. PATENT DOCUMENTS

| | | |
|---|---|---|
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |

(56) References Cited

U.S. PATENT DOCUMENTS

| | | |
|---|---|---|
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,268,971 B2 * | 9/2007 | Samoto ............... G11B 15/602 360/90 |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |

(56) References Cited

U.S. PATENT DOCUMENTS

| | | | |
|---|---|---|---|
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,023,231 B2 | 9/2011 | Guan et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,094,419 B2 | 1/2012 | Guan |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,734 B2 * | 12/2012 | Pentek ............... G11B 5/1278 360/119.03 |
| 8,339,738 B1 | 12/2012 | Tran et al. |
| 8,339,741 B2 | 12/2012 | Zhang et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |

(56) References Cited

U.S. PATENT DOCUMENTS

| | | |
|---|---|---|
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1* | 11/2013 | Liu ............... G11B 5/1278 360/125.3 |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,705,206 B1* | 4/2014 | Maeda ............... G11B 5/23 360/119.04 |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,804,283 B2* | 8/2014 | Meloche ............... G11B 5/1278 29/603.07 |
| 8,813,324 B2 | 8/2014 | Emley et al. |
| 8,830,625 B2* | 9/2014 | Linville ............... G11B 5/1278 360/125.3 |
| 8,848,317 B2* | 9/2014 | Shiimoto ............... G11B 5/56 360/119.01 |
| 8,964,332 B1* | 2/2015 | Katada ............... G11B 5/56 360/125.3 |
| 9,153,255 B1 | 10/2015 | Zheng et al. |
| 2009/0002896 A1* | 1/2009 | Mallary ............... B82Y 10/00 360/319 |
| 2010/0290157 A1 | 11/2010 | Zhang et al. |
| 2011/0086240 A1 | 4/2011 | Xiang et al. |
| 2011/0102942 A1* | 5/2011 | Bai ............... G11B 5/1278 360/125.03 |
| 2011/0116195 A1* | 5/2011 | Cazacu ............... G11B 5/193 360/319 |
| 2011/0242707 A1* | 10/2011 | Yoon ............... G11B 5/012 360/294.1 |
| 2011/0249359 A1* | 10/2011 | Mochizuki ............... G11B 5/1278 360/75 |
| 2011/0255196 A1* | 10/2011 | Wu ............... G11B 5/1278 |

(56) References Cited

U.S. PATENT DOCUMENTS

| | | | |
|---|---|---|---|
| 2011/0292537 A1* | 12/2011 | Jin | G11B 5/1278 360/125.3 360/59 |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0281314 A1* | 11/2012 | Lopusnik | G11B 5/112 360/125.03 |
| 2012/0298621 A1 | 11/2012 | Gao | |
| 2013/0016443 A1 | 1/2013 | de la Fuente et al. | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0154529 A1 | 6/2014 | Yang et al. | |
| 2014/0175050 A1 | 6/2014 | Zhang et al. | |

OTHER PUBLICATIONS

Notice of Allowance dated Mar. 24, 2015 from U.S. Appl. No. 14/289,345, 8 pages.
Ex Parte Quale Action dated Feb. 11, 2015 from U.S. Appl. No. 14/289,345, 6 pages.

* cited by examiner

US 9,349,393 B2

MAGNETIC WRITER HAVING AN ASYMMETRIC GAP AND SHIELDS

CROSS-REFERENCE TO RELATED APPLICATIONS

This application is a divisional application of U.S. application Ser. No. 14/289,345, filed May 28, 2014, entitled "METHOD FOR FABRICATING A MAGNETIC WRITER HAVING AN ASYMMETRIC GAP AND SHIELDS" now U.S. Pat No. 9,153,255 B1 issued on Oct. 6, 2015, which claims priority to provisional U.S. Patent Application Ser. No. 61/948,417, filed on Mar. 5, 2014, which is hereby incorporated by reference in its entirety.

BACKGROUND

FIG. 1 depicts an air-bearing surface (ABS) view of a conventional magnetic recording transducer 10. The magnetic recording transducer 10 may be a perpendicular magnetic recording (PMR) head. The conventional transducer 10 includes an underlayer 12, side gap 14, side shields 16, top gap 17, optional top, or trailing, shield 18 and main pole 20.

The main pole 20 resides on an underlayer 12 and includes sidewalls 22 and 24. The sidewalls 22 and 24 of the conventional main pole 20 form an angle with the down track direction at the ABS. The side shields 16 are separated from the main pole 20 by a side gap 14. The side shields 16 extend at least from the top of the main pole 20 to the bottom of the main pole 20. The side shields 16 also extend a distance back from the ABS. The gap 14 between the side shields 16 and the main pole 20 may have a substantially constant thickness. Thus, the side shields 16 are conformal with the main pole 20.

Although the conventional magnetic recording head 10 functions, there are drawbacks. In particular, the conventional magnetic recording head 10 may not perform sufficiently at higher recording densities. For example, at higher recording densities, a shingle recording scheme may be desired to be sued. In shingle recording, successive tracks partially overwrite previously written tracks in one direction only. Part of the overwritten tracks, such as their edges, are preserved as the recorded data. In shingle recording, the size of the main pole 20 may be increased for a given track size. However, in order to mitigate issues such as track edge curvature, shingle writers have very narrow side gaps 14. Other design requirements may also be present. The magnetic transducer 10 may not perform as desired or meet the design requirements for such recording schemes. Without such recording schemes, the conventional transducer 10 may not adequately perform at higher areal densities. Accordingly, what is needed is a system and method for improving the performance of a magnetic recording head.

DETAILED DESCRIPTION OF THE PREFERRED EMBODIMENTS

Figure 1:
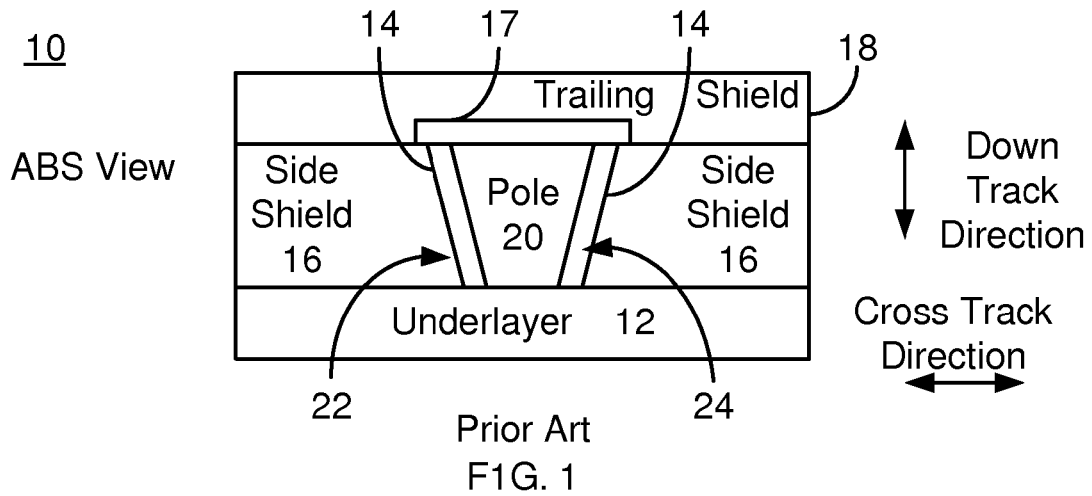
FIG. 1 depicts an ABS view of a conventional magnetic recording head.
Figure 2:
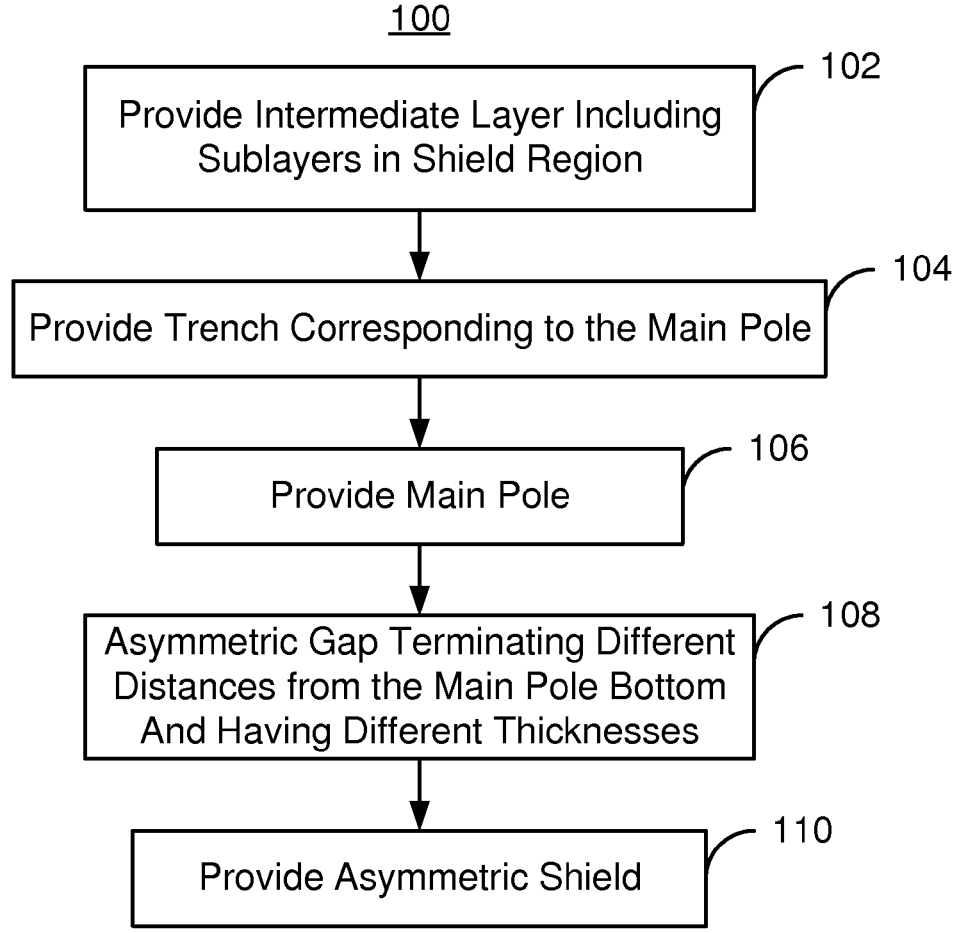
FIG. 2 depicts a flow chart of an exemplary embodiment of a method for providing a magnetic recording transducer having an asymmetric gap and asymmetric shields.

FIG. 2 depicts an exemplary embodiment of a method 100 for providing a magnetic recording transducer. For simplicity, some steps may be omitted, interleaved, combined and/or performed in another order. The method 100 is described in the context of providing a magnetic recording disk drive and transducer 200. However, the method 100 may be used to fabricate multiple magnetic recording transducers at substantially the same time. The method 100 is also described in the context of particular layers. A particular layer may include multiple materials and/or multiple sub-layers. The method 100 also may start after formation of other portions of the magnetic recording head. For example, the method 100 may start after a read transducer, return pole/shield and/or other structure have been fabricated.

An intermediate layer including at least multiple sublayers is provided, via step 102. In at least the region in which the pole tip and side shields are to be formed (shield region), the intermediate layer includes a first sublayer, a second sublayer and at least one etch stop layer between the first and second sublayers. In some embodiments, the first and second sublayers include the same material, such as aluminum oxide or silicon oxide. In other embodiments, the first and second sublayers may include different material(s). The etch stop layer is resistance to an etch (such as a wet etch) of the second sublayer. In some embodiments, for example, the etch stop layer may include silicon nitride and/or silicon oxide. The etch stop layer may also be thin. For example, the etch stop layer may be 8-12 nm thick. In some embodiments, step 102 includes full-film depositing a first layer, full film depositing an etch stop layer and full film depositing a second layer. In an embodiment, the portions of these layers outside of the side shield region and pole tip region may be removed. The first and second sublayers and etch stop layer may thus remain in the side shield region. The third sublayer may then be deposited and the layer(s) planarized. Thus, the intermediate layer may be formed.

A trench is formed in an intermediate layer using one or more etches, via step 104. The trench formed has the desired geometry and location for formation of the main pole. For example, the top of the trench may be wider than the bottom so that the top of the main pole may be wider than the bottom. The trench extends at least partially into the first sublayer in the shield region. In some embodiments, some or all of the trench may extend through the first sublayer. However, if a leading edge bevel is desired, the bottom of the trench may slope in the down track direction. In such embodiments, the portion of the trench at the ABS may not extend through the first sublayer. However, apertures that are the upper portions of the trench are generally formed in the second sublayer and etch stop layer.

The main pole is provided in the trench, via step 106. In some embodiments, step 106 includes depositing a seed layer, such as Ru and/or magnetic seed layer(s). High saturation magnetization magnetic material(s) are also provided. For example, such magnetic materials may be plated and/or vacuum deposited. The material(s) may be planarized. Further, a trailing bevel may be formed in the main pole. Formation of the trailing bevel may include covering a portion of the main pole recessed from the ABS and then ion milling the main pole at an angle from the down track direction. This step may be performed after formation of the side shields. The pole formed in step 106 may be conformal to the trench, nonconformal with the trench, or include both conformal and nonconformal portions.

An asymmetric gap is provided, via step 108. The asymmetric gap terminates at different distances from the top of the pole on the sides of the main pole. In addition, the gap may be thicker on one side of the pole than on the other side of the main pole. Formation of the gap in step 108 may include covering the pole and the intermediate layer on one side of the main pole. The second sublayer is removed on the exposed side of the main pole in the side shield region. Thus, the etch stop layer may be exposed in this region. A nonmagnetic gap layer, such as Ru is deposited after removal of the mask. Another portion of the intermediate layer on the opposite side of the main pole may be removed. A second nonmagnetic layer may be deposited in at least the side shield region. The second nonmagnetic layer may also be Ru. The first and second nonmagnetic layers may form the asymmetric gap on the first side and top of the main pole. The second nonmagnetic layer may form the asymmetric gap on the second side of the main pole. The top of the asymmetric gap extends closer to the top of the main pole on the first side than on the second side. The bottom of the asymmetric gap may be on the etch stop layer on both sides of the main pole. The asymmetric gap is also thicker on the first side than on the second side.

The asymmetric shield(s) are provided in the shield region, via step 110. Step 110 may include plating or otherwise providing the material(s) for the side shields. Because the gap is asymmetric, the bottom of the side shields extend different distances along the sides of the main pole on the first side than on the second side. The asymmetric shield terminates on top of the asymmetric gap. Thus, the asymmetric side shield extends closer to the bottom of the main pole on the second side than on the first side. In some embodiments, the asymmetric shield terminates between the top and bottom of the main pole on both sides of the pole. Thus, the asymmetric shield(s) may be termed asymmetric half side shields. Note, however, that the asymmetric shields need not extend precisely halfway down between the top and bottom of the main pole on either side of the main pole. Instead, the asymmetric side shields may terminate somewhere between the top and bottom of the main pole. In some embodiments, the asymmetric shield may be configured such that the asymmetric shield terminates at or above the top of the main pole on the first side.

Using the method 100, a magnetic transducer having improved performance may be fabricated. A shingle writer may not need to have side shield(s) which extend to the bottom of the main pole. Thus, the method 100 may provide a main pole that may be used in shingle recording. Thus, the benefits of shingle recording may be exploited. The location of the bottom of the asymmetric shields may be set by the thicknesses of the first and second gap layers as well as the location of the etch stop layer. Thus, the side shield geometry may be tailored.

Figure 3A:
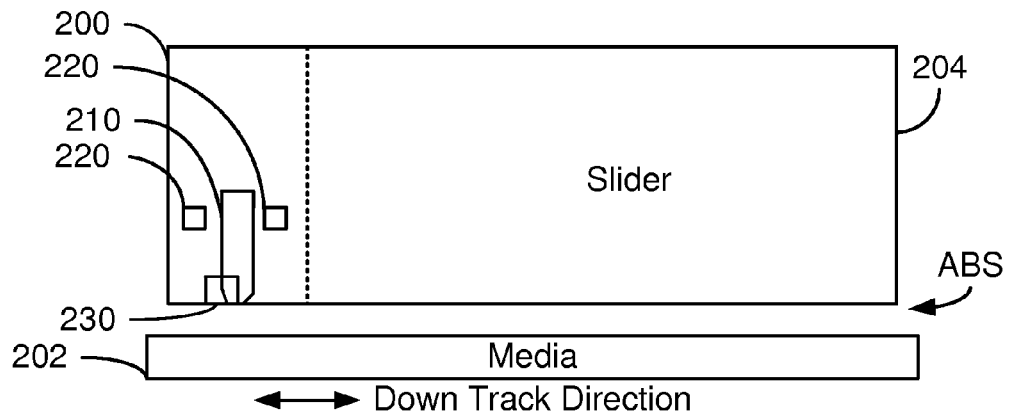
FIGS. 3A, 3B and 3C depict side, ABS and apex views of an exemplary embodiment of a magnetic recording disk drive having an asymmetric gap and asymmetric shields.
Figure 3B:
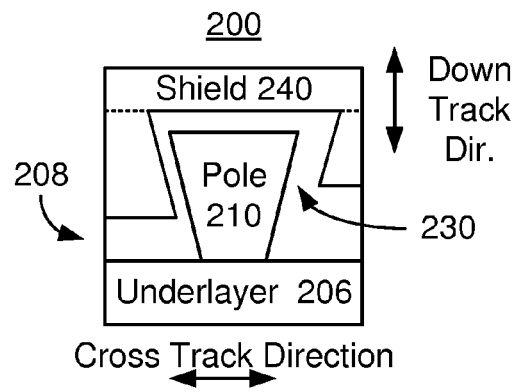
Figure 3C:
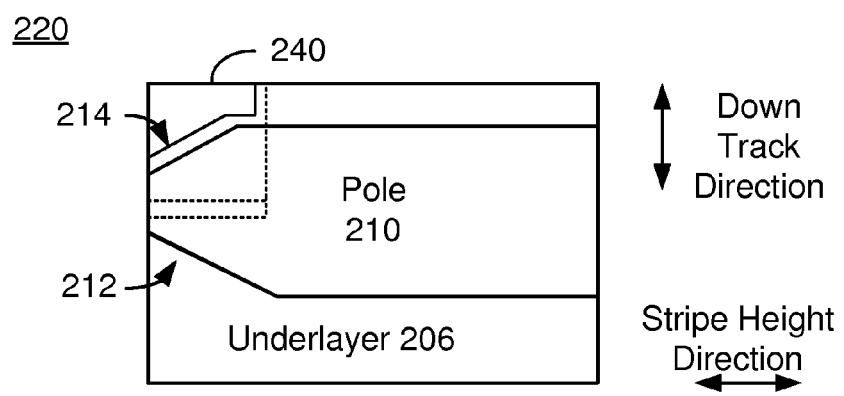

FIGS. 3A, 3B and 3C depict various views of a transducer 200 fabricated using the method 100. FIG. 3A depicts a side view of the disk drive. FIGS. 3B and 3C depict ABS and apex (side/cross-sectional) views of the transducer 200. For clarity, FIGS. 3A-3C are not to scale. For simplicity not all portions of the disk drive and transducer 200 are shown. In addition, although the disk drive and transducer 200 are depicted in the context of particular components other and/or different components may be used. For example, circuitry used to drive and control various portions of the disk drive is not shown. For simplicity, only single components are shown. However, multiples of each components and/or their sub-components, might be used. The disk drive 200 may be a perpendicular magnetic recording (PMR) disk drive. However, in other embodiments, the disk drive 200 may be configured for other types of magnetic recording included but not limited to heat assisted magnetic recording (HAMR).

The disk drive includes a media 202, and a slider 204 on which a transducer 200 have been fabricated. Although not shown, the slider 204 and thus the transducer 200 are generally attached to a suspension. In general, the slider 204 includes the write transducer 200 and a read transducer (not shown). However, for clarity, only the write transducer 200 is shown.

The transducer 200 includes an underlayer 206, an intermediate layer 208, a main pole 210, coil(s) 220, asymmetric gap 230 and asymmetric shields 240. The underlayer 206 may include a bottom (or leading edge) shield. The coil(s) 220 are used to energize the main pole 210. Two turns are depicted in FIG. 3A. Another number of turns may, however, be used. Note that only a portion of the coil(s) 210 may be shown in FIG. 3A. If, for example, the coil(s) 220 is a spiral, or pancake, coil, then additional portions of the coil(s) 220 may be located further from the ABS. Further, additional coils may also be used.

The intermediate layer 208 may include one or more sublayers as well as an etch stop layer. However, one or more of the sublayers may have been removed for formation of the asymmetric gap 230 and asymmetric shields 240. Further, the intermediate layer may also include different layers in regions recessed from the ABS.

The main pole 210 is shown as having a top wider than the bottom. The main pole 210 thus includes sidewalls having sidewall angles that are greater than or equal to zero. In an embodiment, these sidewall angles differ at different distances from the ABS. In some embodiments, the sidewall angles at the ABS are at least three degrees and not more than fifteen degrees. In other embodiments, other geometries may be used. For example, the top may be the same size as or smaller than the bottom. The sidewall angles may vary in another manner including, but not limited to, remaining substantially constant. The main pole 210 may be being conformal with the trench in the intermediate layer 208. In other embodiments, however, at least a portion of the main pole 210 may not be conformal with the sides of the trench. In some embodiments, the main pole 210 may have leading surface bevel 212 and/or a trailing surface bevel 214, as shown in FIG. 3C.

As can be seen in FIG. 3B, the gap 230 is asymmetric. Thus, the gap on one side of the pole 210 is larger than the part of the gap on the other side of the main pole 210. In addition, one side of the gap 230 terminates further from the bottom of the main pole 210 than the other.

The asymmetric shields 240 are shown as including a trailing shield portion and half side shield portions. In other embodiments, the trailing shield portion may be omitted. This is denoted by a dotted line in FIG. 3B. Further, because the asymmetric shields 240 extend different distances along the sidewalls of the main pole 210, the dashed lines in FIG. 3C indicate the side portions of the asymmetric shields 240 on opposite sides of the pole. The asymmetric shields 240 are also shown as having a constant thickness in FIG. 3C. Stated differently, the bottoms of the asymmetric shields 240 are substantially perpendicular to the ABS. Thus, the dashed line corresponding to the bottoms of the asymmetric shields 240 are perpendicular to the ABS. In other embodiments, the geometry of the asymmetric shields 240 may vary. For example, the bottom of the asymmetric shields 240 track the trailing edge of the pole such that the shield covers less of the pole further from the ABS. In other embodiments, the asymmetric shield thickness may vary. In such embodiments, the bottom of the half shield portion of the shield 240 may be parallel to the leading bevel 212 or the trailing bevel 214 while the top surface is perpendicular to the ABS. Other variations are also possible. However, note that bottoms of the asymmetric shields reside on the top of the intermediate layer 208 is between the top and bottom of the pole 210.

The magnetic transducer 200 in the disk drive may be used in shingle recording. Thus, the benefits of shingle recording may be achieved. For example, higher areal density recording may be performed by a head having larger critical dimensions.

Figure 4:
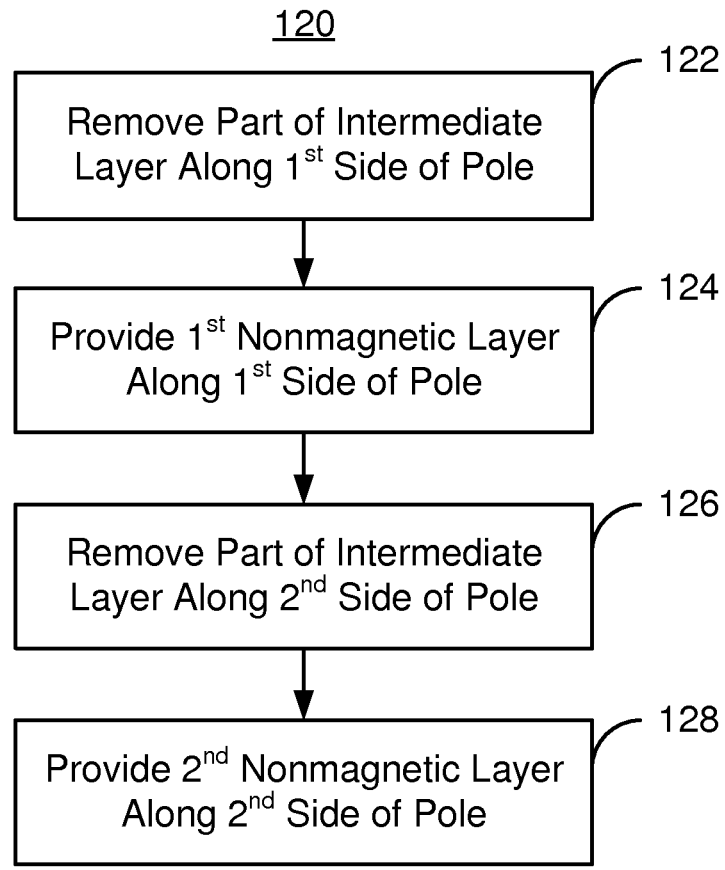
FIG. 4 depicts a flow chart of another exemplary embodiment of a method for providing an asymmetric side gap.

FIG. 4 depicts an exemplary embodiment of a method 120 for providing an asymmetric gap for a magnetic recording transducer. For simplicity, some steps may be omitted, interleaved, performed in another order and/or combined. The method 120 may be used to fabricate multiple magnetic recording heads at substantially the same time. The method 120 may also be used to fabricate other magnetic recording transducers. The method 120 is also described in the context of particular layers. A particular layer may include multiple materials and/or multiple sub-layers. The method 120 also may start after formation of other portions of the magnetic recording transducer. For example, the method 120 may start after at least a portion of the pole has been fabricated.

A portion of the intermediate layer adjacent to one side of the pole is removed, via step 122. In some embodiments, step 122 includes providing a mask that covers the pole and another portion of the intermediate layer along the second, opposite side of the pole. The portion of the intermediate layer may be removed via a wet etch or, in some embodiments, another process such as an RIE. The etch terminates at the etch stop layer. Thus, the second sublayer along the first side of the pole may be removed. The mask may then be removed.

A first nonmagnetic layer is then provided, via step 124. Step 124 may include depositing a Ru layer, for example via chemical vapor deposition, sputtering or another method. In some embodiments, the first nonmagnetic layer extends across the top of the pole. In other embodiments, the first nonmagnetic layer is only on the first side of the pole. For example, the layer may be provided before removal or the mask or the portion of the layer on the top of the pole may be removed. A portion of the first nonmagnetic layer may also reside on the etch stop layer. In some embodiments, step 124 may include refilling the region adjacent to the first side of the main pole with a nonmagnetic material, such as aluminum oxide. Such a refill step may be used to provide a more flat topography for subsequent steps.

A portion of the intermediate layer adjacent to the second side of the main pole is removed, via step 126. Step 126 may be performed in an analogous manner to step 122. Thus, the etch stop layer may be exposed along the second side of the main pole. In some embodiments, the top of the first nonmagnetic layer is exposed along the first side of the main pole.

A second nonmagnetic layer is provided, via step 128. Step 128 may be analogous to step 124. For example, a Ru layer may be deposited. In some embodiments, the first and second nonmagnetic layers have different thicknesses. For example, the first nonmagnetic layer may be thicker than the second nonmagnetic layer. In other embodiments, the thicknesses may be the same. Fabrication of the magnetic transducer may then be completed.

Figure 5:
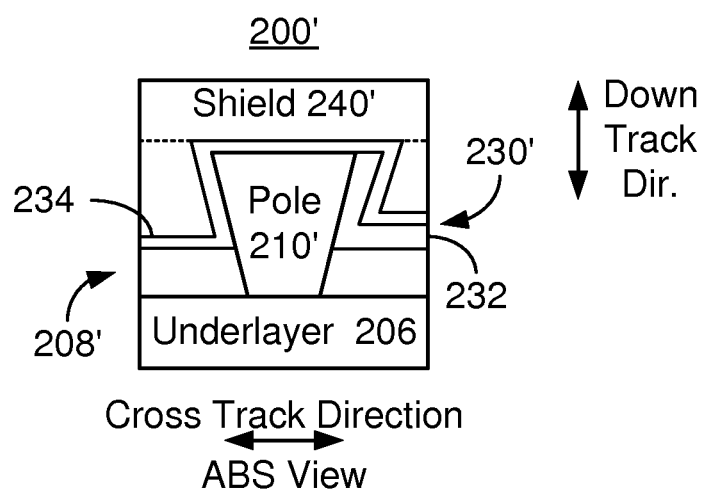
FIG. 5 depicts an ABS view of another exemplary embodiment of a magnetic recording transducer.

FIG. 5 depicts an ABS view of a transducer 200' having an asymmetric gap fabricated using the method 120. For clarity, FIG. 5 is not to scale. For simplicity not all portions of the transducer 200' are shown. Although the transducer 200' is depicted in the context of particular components, other and/or different components may be used. For example, circuitry used to drive and control various portions of the transducer is not shown. For simplicity, only single components are shown. However, multiples of each components and/or their sub-components, might be used. The transducer 200' may be a PMR transducer. However, in other embodiments, the transducer 200' may be configured for other types of magnetic recording included but not limited to HAMR.

The transducer 200' is analogous to the transducer 200 and disk drive depicted in FIGS. 3A-3C. Consequently, analogous components have similar labels. For example, the transducer 200' includes an underlayer 206, intermediate layer 208, pole 210', gap 230' and shield 240' analogous to the underlayer 206, intermediate layer 208, pole 210, gap 230 and shield 240 of FIGS. 3A-3D.

As can be seen in FIG. 5, the asymmetric gap 230' includes two nonmagnetic layers 232 and 234. The magnetic layer 232 is only on the first (right) side of the main pole 210'. The second nonmagnetic layer 234 covers both sides and the top of the main pole 210'. Thus, the first nonmagnetic layer 232 may be provided in step 124, while the second nonmagnetic layer 234 may be provided in step 128. In other embodiments, the first nonmagnetic layer may cover the top and both sides of the main pole 210 while the second nonmagnetic layer 234 may cover only one side of the main pole. In addition, the second nonmagnetic layer 234 that also forms the top, write gap is depicted as thinner than the first nonmagnetic layer 232. However, in other embodiments, the relationship between the thicknesses of the layers 232 and 234 may be different. The shield 240' is also asymmetric. The portion of the shield 240' on the first side of the main pole 210' terminates closer to the top and is further from the main pole 210'.

The magnetic transducer 200' in the disk drive may be used in shingle recording. Thus, the benefits of shingle recording may be achieved. For example, higher areal density recording may be performed by a head having larger critical dimensions.

Figure 6:
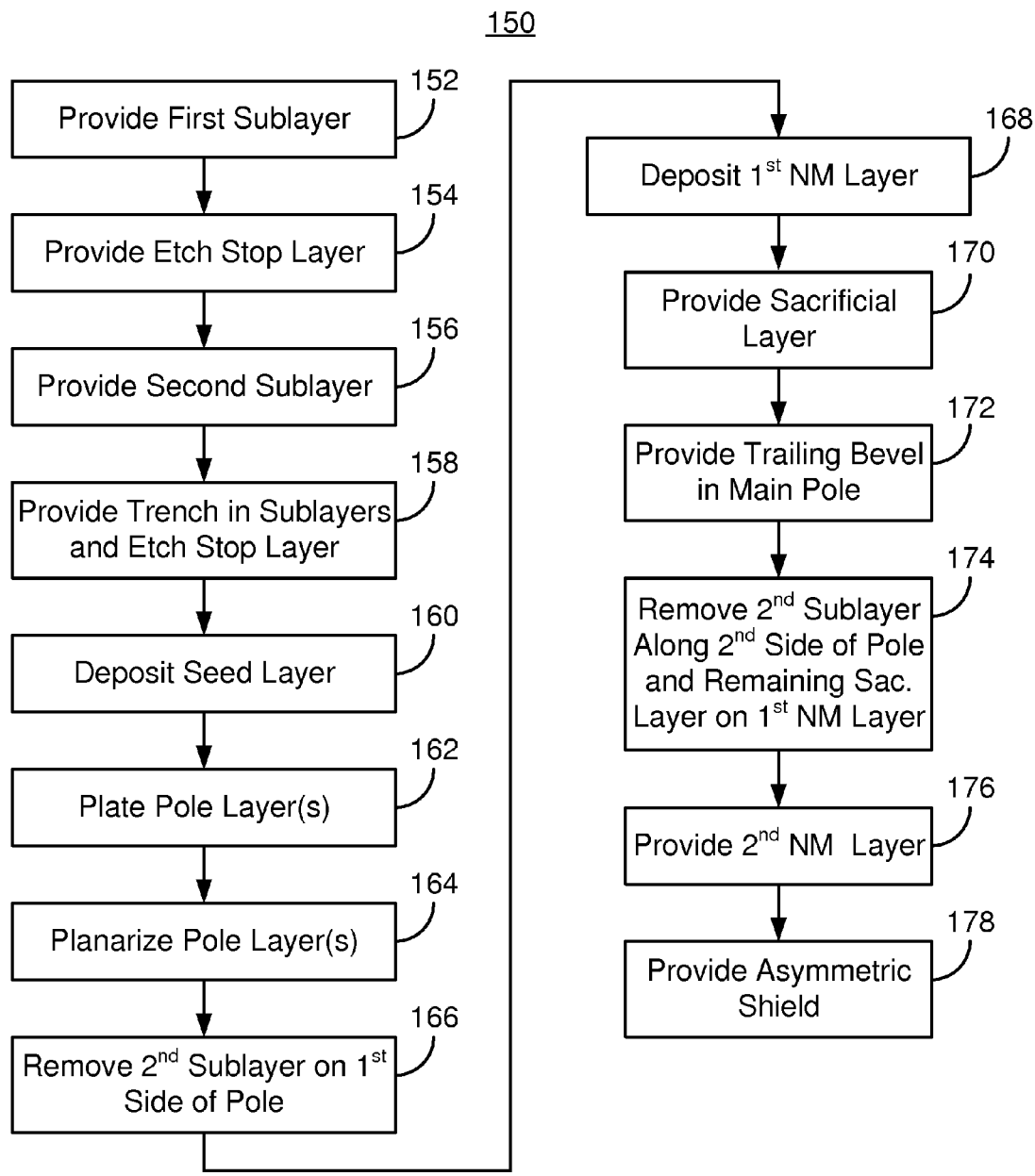
FIG. 6 depicts a flow chart of another exemplary embodiment of a method for providing a magnetic recording transducer having an asymmetric gap and asymmetric shields.

FIG. 6 depicts an exemplary embodiment of a method 150 for providing a pole for a magnetic recording transducer having asymmetric side gap and shield. For simplicity, some steps may be omitted, interleaved, performed in another order and/or combined. The method 150 is also described in the context of providing a magnetic recording transducer 250 depicted in FIGS. 7-21 depict ABS views of an exemplary embodiment of a transducer 250 during fabrication using the method 150. The method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated.

Figure 7:
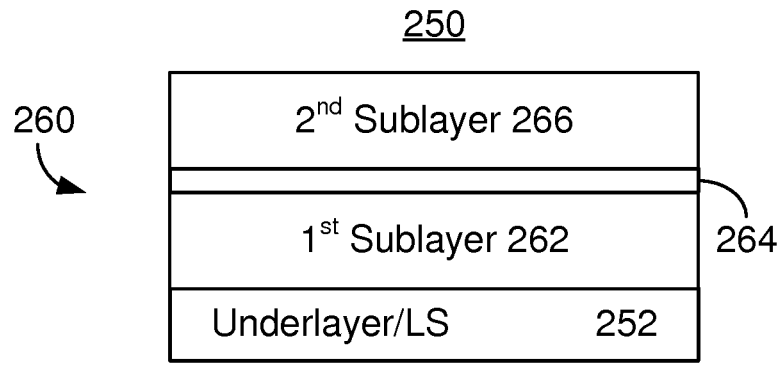
FIGS. 7 through 21 depict ABS views of an exemplary embodiment of a magnetic recording transducer fabricated using the method.

The material(s) for the first sublayer are full-film deposited, via step 152. In some embodiments, step 152 includes full-film depositing aluminum oxide. The materials for the etch stop layer are provided, via step 154. Step 154 may include full-film depositing silicon dioxide or another material that is resistant to an aluminum oxide wet etch. The material(s) for the second sublayer are provided, via step 156. Step 156 may include full-film depositing aluminum oxide on the silicon oxide layer. In addition, steps 152, 154, and 156 may be carried out so that the structure including two sublayers separated by the etch stop layer are only in the shield region. FIG. 7 depicts an ABS view of the transducer 250 after step 156 has been performed. Thus, the first sublayer 262 has been provided on the underlayer 252. The etch stop layer 264 has been deposited on the first sublayer 262. The second sublayer 266 has been provided on the etch stop layer 264. Thus, the first sublayer 262 and second sublayer 266 may be aluminum oxide while the etch stop layer 264 may be silicon oxide. Other materials may be used, but the first and second sublayers are generally desired to be removable using the same etch. The etch stop layer 264 is desired to be resistant to at least some etches of the layer 262 and 266, but removable using other etches that are the same as for the layers 262 and 266. For example, a particular wet etch that would remove the first sublayer 262 and the second sublayer 266 would not remove the etch stop layer 254. However, other etches, such as a chlorine based or fluorine based RIE may remove layers 262, 264 and 266. The layers 262, 264 and 266 form at least part of the intermediate layer 260. The total thickness of the intermediate layer 260 may be at least that desired for the main pole. The etch stop layer 264 is desired to be thin, for example eight to twelve nanometers. In some embodiments, the etch stop layer 264 is nominally ten nanometers thick. The thicknesses of the layers 262, 264 and 266 may be designed such that the asymmetric gap resides on the top of the etch stop layer 264 at the desired height. Also shown is underlayer 252. The underlayer 252 may include two sublayers. A portion of the underlayer 252 at and near the ABS may be a NiFe layer used as a leading shield, while a portion of the underlayer recessed from the ABS may be a Ru layer. However, in other embodiments, other configurations, including other material(s) may be used.

Figure 8:
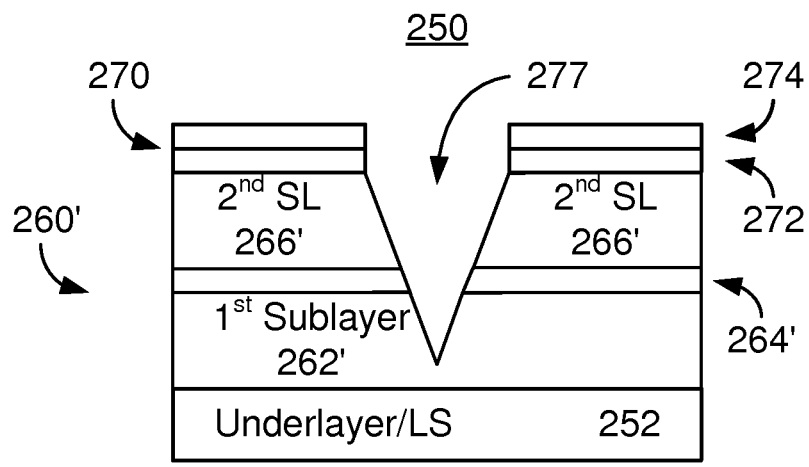

A trench is formed in the intermediate layer, via step 158. Step 158 may include multiple substeps. For example, a mask including an aperture that corresponds to a trench may be provided on the intermediate layer 260. This may be accomplished using a photoresist line mask. For example, first and second hard mask layers, such as Ta and Ru, may be full film deposited. The Ta mask layer and the Ru mask layer may each be nominally fifty nanometers thick. A photoresist mask having a line corresponding to the region of the pole near the ABS is then fabricated on the first and second hard mask layers. A third hard mask layer, such as Ta, may be provided on the first and second hard mask layers and the photoresist mask. This hard mask layer may be a Ta layer that is nominally twenty nanometer thick. The photoresist mask is then removed. The location of the photoresist mask forms the location of the aperture in the hard mask layers. The photoresist mask removal may be carried out by side milling the photoresist mask to remove the third hard mask layer, then performing a lift off. A trench is formed in region of the intermediate layer 260 that is exposed by the aperture in the hard mask layers. Step 166 may include performing an aluminum oxide RIE (or other RIE(s) appropriate for the layers 262, 264 and 266). This RIE may remove the hard mask layers under the aperture in the third hard mask layer or these hard mask layers may be removed in another manner. In some embodiments, multiple RIEs are used to obtain the desired trench profile for various regions of the transducer 250. For example, fluorine-based and/or chlorine-based RIE(s) may be performed. FIG. 8 depicts an ABS view of the transducer 250 after step 158 has been performed. Thus, a trench 277 has been formed in layers 262', 264' and 266' (in intermediate layer 260'). In the embodiment shown, the bottom of the trench 277 does not reach the underlayer 252 at the ABS. Thus, apertures are formed in layers 264' and 266', but a groove formed in at least part of the layer 262'. However, the trench 277 may be deeper at other regions, such as in the yoke region. Thus, the pole being formed may have a leading edge bevel. In addition, the trench 277 has a triangular profile at the ABS. In other embodiments, the bottom of the trench 277 has a flat surface and, therefore, a trapezoidal shape at the ABS. The trench 277 resides below an aperture in the mask 270. The mask 270 includes layers 272 and 274. In the embodiment shown, a third hard mask layer may have been removed during formation of the trench 277. In other embodiments, other masks 270 may be used.

Seed layer(s) that are resistant to an etch of the intermediate layer 260 is deposited in the trench, via step 160. In some embodiments, this seed layer may serve as at least part of the gap. The seed layer may include material(s) such as Ru deposited using methods such as chemical vapor deposition. In other embodiments, a magnetic seed layer may be used in lieu of or in addition to a nonmagnetic seed layer.

Figure 9:
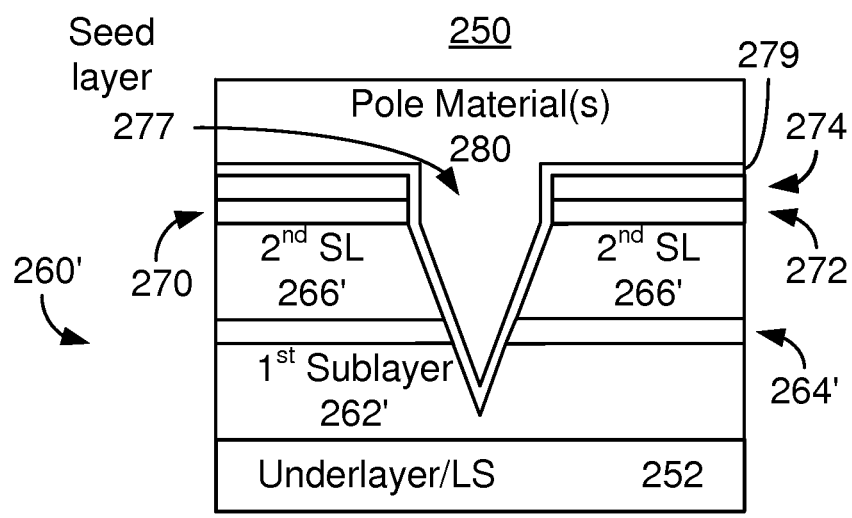

The material(s) for the main pole may then be provided, via step 162. Step 162 includes depositing high saturation magnetization magnetic material(s), for example via electroplating. In some embodiments, the pole materials provided in step 162 fills the trench 277. However, in other embodiments, the pole may occupy only a portion of the trench. FIG. 9 depicts an ABS view of the transducer 250 after a step 162 has been performed. Thus, the seed layer 279 and pole materials 280 have been provided. A leading bevel may be naturally formed in the magnetic pole to the shape of the trench 277 and the deposition techniques used.

Figure 10:
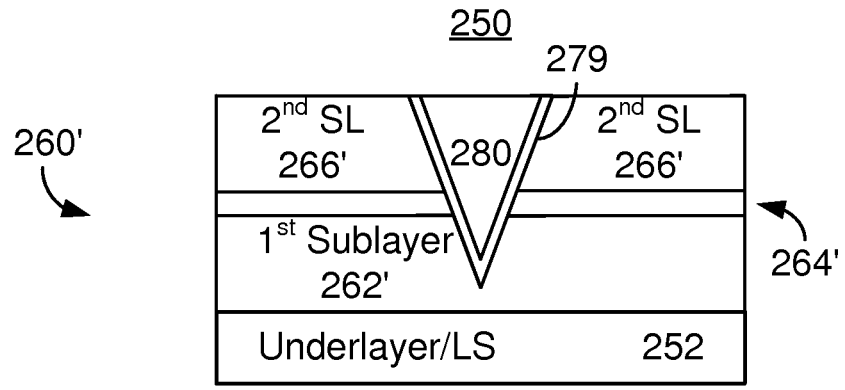

A planarization, such as a chemical mechanical planarization (CMP) may also be performed, via step 164. In some embodiments, a trailing edge (top) bevel may be formed at this time. In other embodiments, however, the trailing bevel may be formed layer. A mill may also be used to remove the mask 270. FIG. 10 depicts an ABS view of the transducer 250 after step 164 has been completed. Thus, the portion of the main pole materials outside of the trench has been removed, forming main pole 280.

Figure 11:
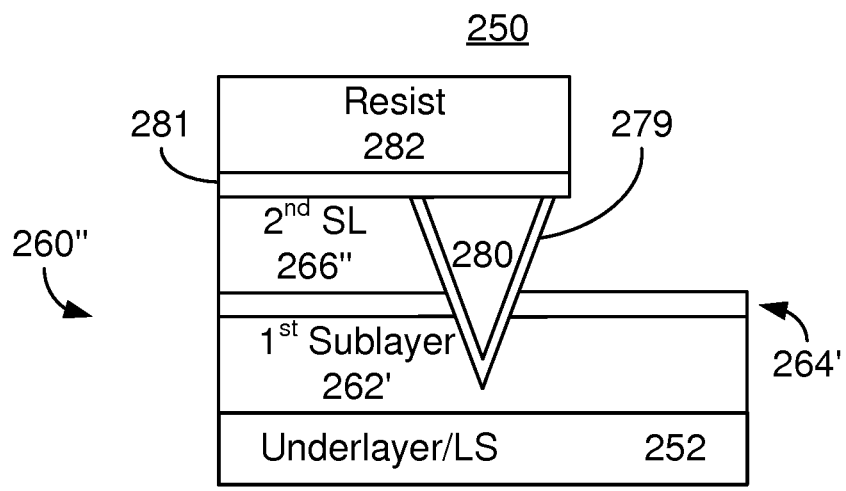
Figure 12:
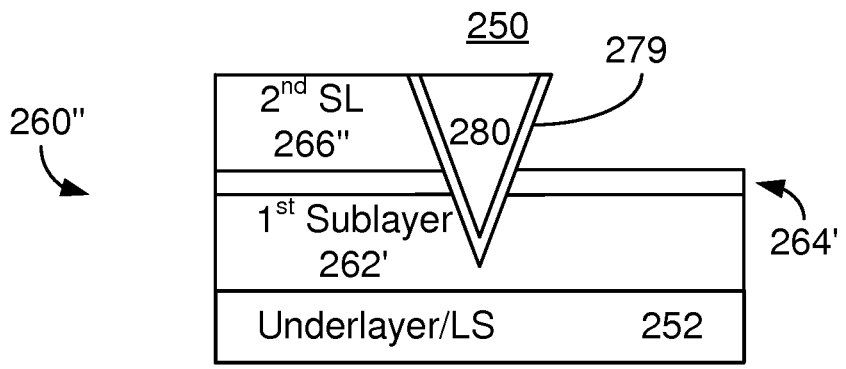

A portion of the intermediate layer 260 adjacent to the first side of the main pole 280 may be removed, via step 166. In particular, a portion of the second sublayer adjacent to the first side of the main pole 280 may be removed in at least the region in which the shields are to be formed. Step 166 includes providing a mask that covers the main pole 280 and the second sublayer on the second side of the main pole 280. In some embodiments, the removal of the second sublayer may be performed using a wet etch, such as an aluminum oxide wet etch. After the etch, the mask may be removed. FIG. 11 depicts the transducer 250 during step 166. Thus, the photoresist mask 282 and hard mask 281 are shown covering the main pole 280 and portion of the second sublayer 266" on the opposite side of the main pole 280. The second sublayer has been removed from the first side of the main pole 280. Thus, the remaining intermediate layer 260" includes the first sublayer 262', the etch stop layer 264' and the second sublayer 266". The seed layer 279, etch stop layer 264' and masks 281 and 282 are barriers against the etch used in step 166. FIG. 12 depicts the transducer after step 166 has been performed. Thus, the masks 281 and 282 have been removed.

Figure 13:
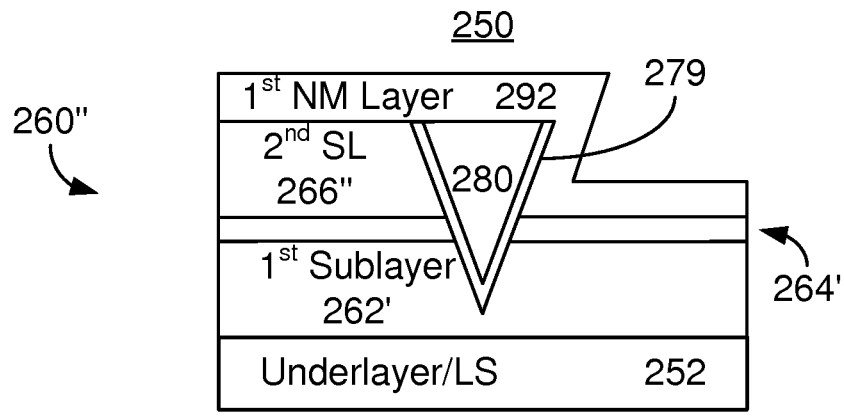

A first nonmagnetic layer for the asymmetric gap is provided, via step 168. Step 168 includes depositing a Ru layer, for example via chemical vapor deposition. FIG. 13 depicts and ABS view of the transducer after step 168 has been performed. Thus, nonmagnetic layer 292 is shown. Thus, on the first side of the main pole 280, the gap would be formed by at least the seed layer 279 and the nonmagnetic layer 292.

Figure 14:
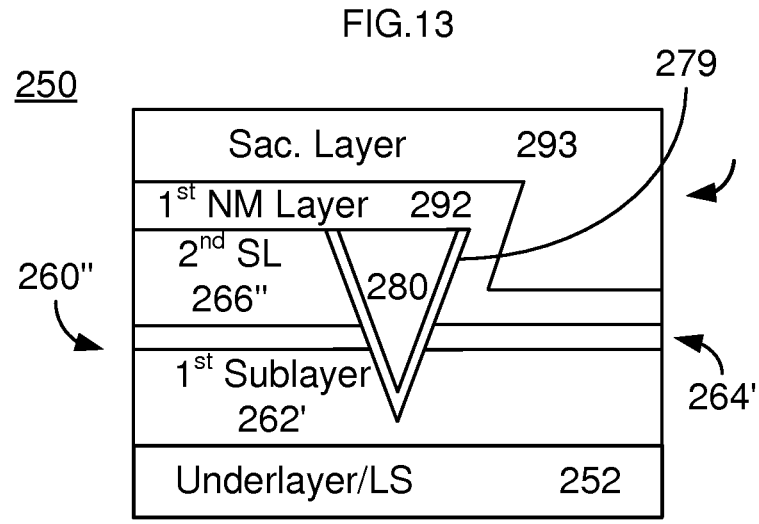
Figure 15:
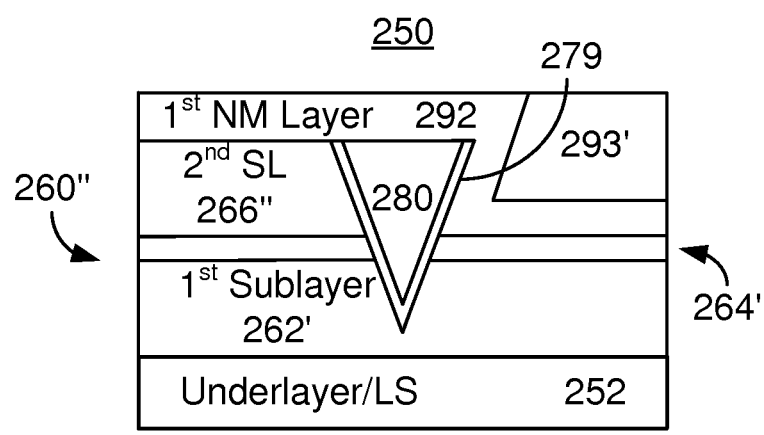

The region above the portion of the first nonmagnetic layer 292 that is lower than the top of the pole 280 is desired to be refilled. Thus, a sacrificial layer is provided, via step 170. Step 170 may include depositing an aluminum oxide layer and then planarizing the layer. FIG. 14 depicts an ABS view of the transducer 250 after the deposition of sacrificial layer 293. Step 170 may be completed by the planarization, which exposes the top of the first nonmagnetic layer 292 on top of the main pole 280. FIG. 15 depicts an ABS view of the transducer 250 after step 170 is completed. Thus, the portion of the sacrificial layer 293' on the first side of the main pole remains.

Figure 16:
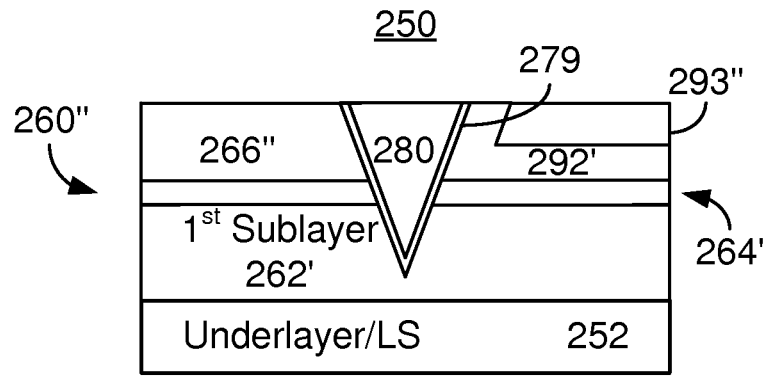

A trailing bevel may optionally be provided in step 172. Step 172 may include removing the portion of the first nonmagnetic layer 292 on top of the main pole 280, for example via an ion mill. A mask the covers part of the main pole 280 recessed from the ABS but leaves the portion of the main pole near the ABS uncovered may then be formed. For example, a Ru layer may be full film deposited, then patterned using a photoresist mask that is recessed from the ABS. An ion mill may then be performed. Because of shadowing due to the masks, the top of the main pole 280 may be removed such that the top of the main pole 280 is at a nonzero angle from a direction perpendicular to the ABS. Other methods could also be used to form the trailing bevel. FIG. 16 depicts an ABS view of the transducer 250 after step 172 has been completed. Thus, a portion of the first nonmagnetic layer 292', refill 293" and second sublayer 266" remains. In addition, the pole 280 is shorter at the ABS than previously.

Figure 17:
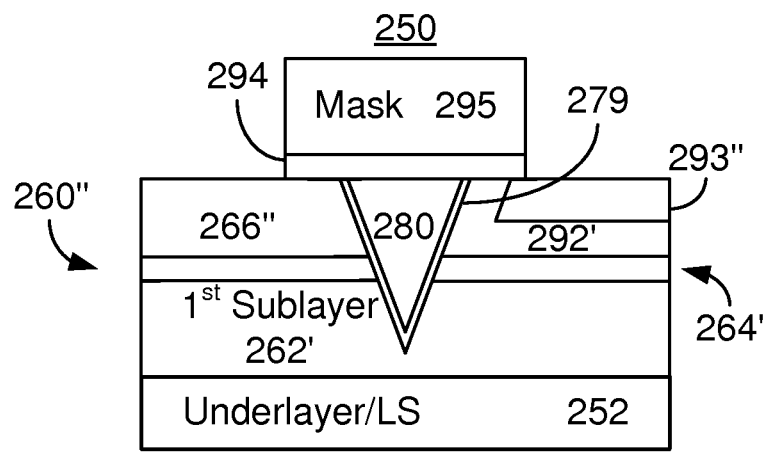
Figure 18:
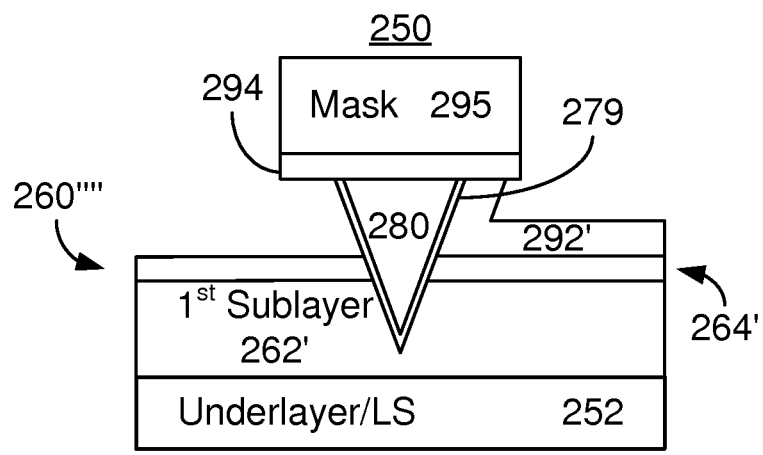
Figure 19:
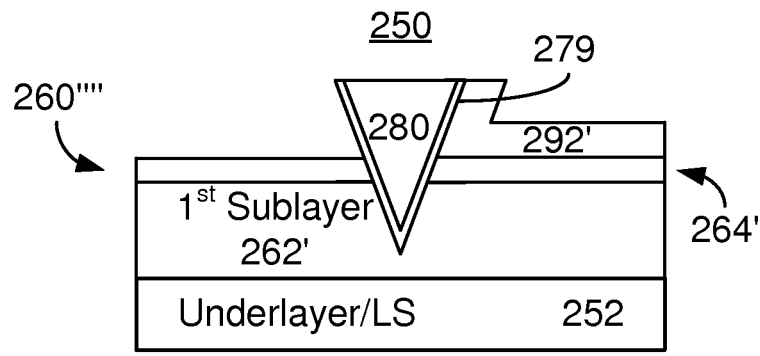

The portion of the second sublayer 266" that is adjacent to the second side of the main pole 280 is removed in at least the region in which the shields are to be formed, via step 174. Also in step 174, the refill 293' may be removed in at least the region in which the shields are to be formed. Step 174 may include multiple substeps. For example, a mask that covers the main pole 280 but uncovers portions of the intermediate layer 260' and refill 293' is provided. FIG. 17 depicts an ABS view of the transducer 250 after the mask has been provided. Thus, a nonmagnetic layer 294 and a resist mask 295 are shown. An etch that removes the desired portions of layers 266" and 293' is performed. For example, an aluminum oxide wet etch may be used. In other embodiments multiple etches may be performed to remove the desired portions of layers 266" and 293'. FIG. 18 depicts an ABS view of the transducer 250 after this wet etch has been carried out. Thus, the top of the etch stop layer 264' is exposed on the second side of the main pole 280, while the top of the first nonmagnetic layer 292' is exposed on the first side of the main pole 280. The mask layers 294 and 295 may then be removed. FIG. 19 depicts an ABS view of the transducer 250 after step 174 is completed. Thus, the portions of layers 264' (on the second side of the main pole 280), 292' (on the first side of the main pole) and 279 (at the edges of the main pole 280) as well as the main pole 280 are exposed.

Figure 20:
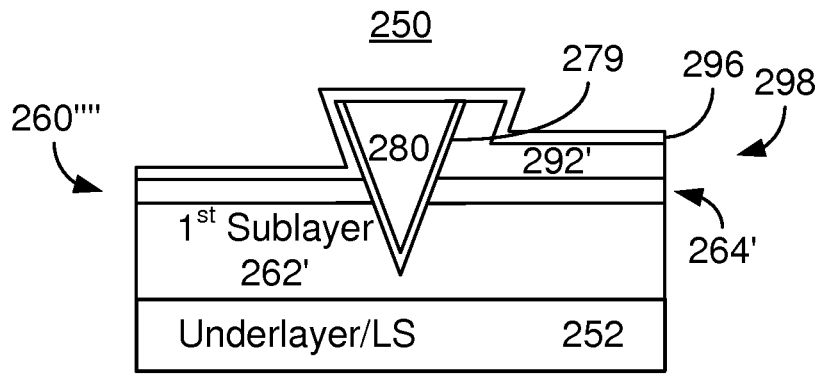

A second nonmagnetic layer that is to form part of the asymmetric gap is deposited, via step 176. Step 176 may include depositing a nonmagnetic layer using chemical vapor deposition, sputtering, plating or another method. FIG. 20 depicts an ABS view of the transducer 250 after step 176 is carried out. Thus, a nonmagnetic layer 296 is deposited. The nonmagnetic layer 296 may also form all or part of the write gap as it resides on the trailing surface of the main pole 280. The asymmetric gap 298 may be considered to be formed by layers 292', 296 and 279.

Figure 21:
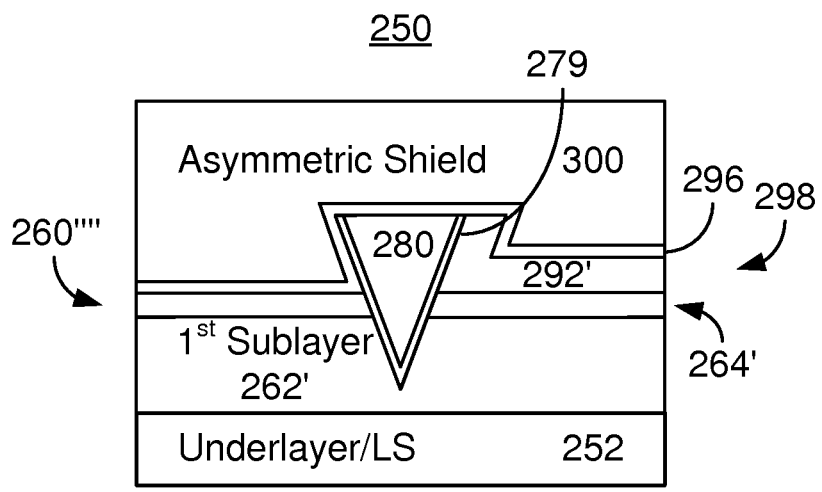

The asymmetric shield(s) may be provided, via step 178. Step 178 may include depositing a seed layer as well as the material(s) for the shields. For example, a seed layer may be deposited, followed by electroplating of a magnetic material such as NiFe. In some embodiments, the asymmetric shields are part of a wraparound shield. Thus, step 178 may also include providing a wraparound shield. If the layer 296 is not to form the write gap, then a write gap layer may also be provided. FIG. 21 depicts an ABS view of the transducer 250 after step 178 has been performed. Thus, the asymmetric shield 300 is shown. As can be seen in FIG. 21, the shield 300 terminates closer to the trailing surface of the main pole 280 on the first side than on the second side of the main pole 280. This is because of the presence of the asymmetric gap 298. The asymmetric shield 300 also includes a trailing shield portion above the top/trailing surface of the main pole 280. Thus, the asymmetric shield 300 may be considered a wraparound shield. In other embodiments, the trailing portion of the shield 300 might be removed.

Using the method 150, the transducer 250 including shield 300 may be provided. Thus, the benefits of shingle recording may be achieved. For example, higher areal density recording may be performed by a head having larger critical dimensions.

We claim:

1. A magnetic transducer having an air-bearing surface (ABS) comprising:
   an intermediate layer having a trench therein;
   a main pole, a portion of the main pole residing in the trench, the main pole having a bottom, a top wider than the bottom, a first side and a second side opposite to the first side;
   an asymmetric gap having a first portion of the asymmetric gap along the first side of the main pole, a second portion of the asymmetric gap along the second side of the main pole, and a third portion of the asymmetric gap along the top of the main pole, the asymmetric gap terminating between the top and the bottom of the main pole, the first portion of the asymmetric gap terminating closer to the top of the main pole than the second portion of the asymmetric gap, the first portion of the asymmetric gap having a first thickness, the second portion of the asymmetric gap having a second thickness, the second thickness being different from the first thickness; and
   an asymmetric shield on the asymmetric gap, the asymmetric shield including a half side shield, a bottom of the half side shield being between the top and the bottom of the main pole and terminating on the asymmetric gap.

2. The magnetic recording transducer of claim 1 further comprising:
   a leading shield.

3. The magnetic recording transducer of claim 1 wherein the second thickness is less than the first thickness.

4. The magnetic recording transducer of claim 1 wherein the intermediate layer further includes:
   an etch stop layer, a first portion of the etch stop layer residing under the first portion of the asymmetric gap, a second portion of the etch stop layer residing under the second portion of the asymmetric gap.

5. The magnetic recording transducer of claim 1 wherein the asymmetric gap further includes a third portion and a fourth portion, the third portion adjoining the first portion and extending in a cross track direction, the fourth portion adjoining the second portion and extending in the cross track direction.

6. The magnetic recording transducer of claim 5 wherein the asymmetric shield includes a trailing shield, the trailing shield is magnetically coupled with the half side shield such that the trailing shield and the half side shield form a wrap-around shield.

* * * * *